US011155039B2

(12) United States Patent
Susnjara (10) Patent No.: US 11,155,039 B2
(45) Date of Patent: Oct. 26, 2021

(54) WARP COMPENSATION FOR ADDITIVE MANUFACTURING

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 16/596,305

(22) Filed: Oct. 8, 2019

(65) Prior Publication Data
US 2021/0101343 A1  Apr. 8, 2021

(51) Int. Cl.
| | |
|---|---|
| B29C 64/393 | (2017.01) |
| B33Y 10/00 | (2015.01) |
| B29C 64/118 | (2017.01) |
| B33Y 30/00 | (2015.01) |
| B33Y 50/02 | (2015.01) |
| B29C 64/10 | (2017.01) |
| G06F 30/20 | (2020.01) |
| G06F 111/10 | (2020.01) |
| G06F 113/10 | (2020.01) |

(52) U.S. Cl.
CPC ............ *B29C 64/393* (2017.08); *B29C 64/10* (2017.08); *B29C 64/118* (2017.08); *B33Y 10/00* (2014.12); *B33Y 30/00* (2014.12); *B33Y 50/02* (2014.12); *G06F 30/20* (2020.01); *G06F 2111/10* (2020.01); *G06F 2113/10* (2020.01)

(58) Field of Classification Search
CPC .................................................. B29C 64/386
See application file for complete search history.

(56) References Cited

U.S. PATENT DOCUMENTS

| | | | | |
|---|---|---|---|---|
| 5,128,235 A | * | 7/1992 | Vassiliou | G03F 7/0037 264/401 |
| 5,506,607 A | * | 4/1996 | Sanders, Jr. | B41J 2/01 118/695 |
| 5,637,175 A | * | 6/1997 | Feygin | B22C 9/00 156/264 |
| 5,740,051 A | * | 4/1998 | Sanders, Jr. | B29C 64/106 700/119 |
| 7,731,816 B2 | | 6/2010 | Oldani et al. | |
| 7,810,539 B2 | | 10/2010 | Mischler et al. | |
| 8,151,854 B2 | | 4/2012 | Oldani | |

(Continued)

OTHER PUBLICATIONS

Extended European search report issued in related EP application No. 20197298.1, dated Mar. 5, 2021 (12 pages) (Year: 2021).*

(Continued)

*Primary Examiner* — Benjamin A Schiffman
(74) *Attorney, Agent, or Firm* — Bookoff McAndrews, PLLC (57) ABSTRACT

An additive manufacturing method includes receiving a design model indicative of a part that may be fabricated using the additive manufacturing method, and generating expected-warping information based on the design model, the expected-warping information being indicative of an expected change in a shape of the part resulting from the additive manufacturing method. The method also includes modifying the design model based on the expected-warping information and fabricating the part using the modified design model.

19 Claims, 7 Drawing Sheets

(56) References Cited

U.S. PATENT DOCUMENTS

| | | | |
|---|---|---|---|
| 8,534,338 B2 | 9/2013 | Oldani et al. | |
| 8,954,180 B2 | 2/2015 | Oldani | |
| 9,833,986 B1* | 12/2017 | Susnjara | B29C 64/10 |
| 10,220,566 B2* | 3/2019 | Bauza | B29C 64/153 |
| 10,409,932 B2* | 9/2019 | Tang | B29C 64/386 |
| 2007/0044899 A1 | 3/2007 | Tingley | |
| 2008/0006017 A1 | 1/2008 | Rindels | |
| 2010/0200168 A1 | 8/2010 | Oldani et al. | |
| 2015/0061170 A1* | 3/2015 | Engel | B33Y 10/00 |
| | | | 264/40.1 |
| 2016/0086376 A1* | 3/2016 | Tang | G06F 30/00 |
| | | | 345/420 |
| 2016/0098824 A1* | 4/2016 | Fry | B33Y 50/02 |
| | | | 700/108 |
| 2017/0090461 A1* | 3/2017 | Chong | B33Y 40/00 |
| 2017/0165918 A1* | 6/2017 | Yuji | G05B 19/4099 |
| 2017/0252973 A1* | 9/2017 | Clark | B22F 5/10 |
| 2018/0050502 A1 | 2/2018 | Oldani | |
| 2018/0056595 A1* | 3/2018 | Sterenthal | B29C 64/40 |
| 2018/0071986 A1* | 3/2018 | Buller | B22F 3/1055 |
| 2018/0085826 A1* | 3/2018 | Luo | B22F 3/1055 |
| 2018/0236728 A1* | 8/2018 | Hovanec | B29C 64/386 |
| 2018/0314235 A1* | 11/2018 | Mirabella | G06F 30/23 |
| 2018/0322621 A1* | 11/2018 | Craeghs | G01N 21/8851 |
| 2018/0333924 A1* | 11/2018 | Modzel | B33Y 10/00 |
| 2019/0143607 A1* | 5/2019 | Ogawa | G06F 30/20 |
| | | | 374/55 |
| 2020/0001533 A1* | 1/2020 | Packirisamy | B28B 1/001 |

OTHER PUBLICATIONS

Sloan, "Big additive machines tackle large molds," CompositesWorld, Jun. 11, 2019. (8 pages).

Schmutzler et al. "Compensating warpage of 3D printed parts using free-form deformation." Procedia CIRP; vol. 41, Jan. 1, 2016, pp. 1017-1022 (6 pages).

Afazov et al. "Distortion prediction and compensation in selective laser melting." Additive Manufacturing; vol. 17, Oct. 1, 2017, pp. 15-22 (8 pages).

Mazur et al. "Numerical and experimental evaluation of a conformally cooled H13 steel injection mould manufactured with selective laser melting." The International Journal of Advanced Manufacturing Technology, Springer, London; vol. 93, No. 1, May 30, 2017, pp. 881-900 (20 pages).

* cited by examiner

WARP COMPENSATION FOR ADDITIVE MANUFACTURING

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process, which may be referred to as Fused Deposition Modeling (FDM) or Fused Layer Modeling (FLM) comprises a process of melting a thin layer of thermoplastic material, and applying this material in layers to produce a final part. This is commonly accomplished by passing a continuous thin filament of thermoplastic material through a heated nozzle, which melts the material and applies it to the structure being printed. The heated material is applied to the existing structure in thin layers, melting and fusing with the existing material to produce a solid finished product.

The filament used in the aforementioned process may be produced by, for example, using a plastic extruder, which may include steel extruder screw configured to rotate inside of a heated steel barrel. Thermoplastic material in the form of small pellets may be introduced into one end of the rotating screw. Friction from the rotating screw, combined with heat from the barrel may soften the plastic, which may then be forced under pressure through a small round opening in a die attached to the front of the extruder barrel. This extrudes a string of material which is cooled and coiled up for use in the 3D printer.

Melting a thin filament of material in order to 3D print an item may be a very slow process, which may be suitable for producing relatively small items or a limited number of items. Therefore, the melted filament approach to 3D printing may be too slow to manufacture large items. However, the fundamental process of 3D printing using molten thermoplastic materials may offer advantages for the manufacture of larger parts or a larger number of items.

In some instances, the process of 3D-printing a part may involve a two-step process. For example, the process may utilize a large print bead to achieve an accurate final size and shape. This two-step process, commonly referred to as near-net-shape, may begin by printing a part to a size slightly larger than needed, then machining, milling or routing the part to the final size and shape. The additional time required to trim the part to final size may be compensated for by the faster printing process.

Print heads for additive manufacturing machines used to print thermoplastic material in relatively large beads have generally included a vertically-mounted plastic extruder connected to a print nozzle to deposit the bead of material onto a surface and/or part being printed. The flowable material, such as, e.g., molten thermoplastic material, may be infused with a reinforcing material (e.g., strands of fiber) to enhance the material's strength. The flowable material, while generally hot and pliable, may be deposited upon a substrate (e.g., a mold), and then pressed down or otherwise flattened and/or leveled to a consistent thickness. Traditional print heads may include an oscillating plate surrounding the print nozzle, the plate being configured to oscillate vertically to flatten the bead of material against the surface or part on which bead is deposited, which may include a previously-deposited bead of material. The deposition process may be repeated so that each successive layer of flowable material may be deposited upon an existing layer to build up and manufacture a desired structure for a component or part. In order to achieve proper bonding between printed layers, it may be necessary to ensure that the temperature of the previously-deposited layer is within a certain range when a layer is deposited thereon. For example, the previously-deposited layer may need to be have cooled to an appropriate degree and thereby have solidified sufficiently to support the new layer. However, this previously-deposited layer may need to retrain sufficient heat to soften and fuse with the new layer, thus resulting in a solid part at the conclusion of the manufacturing process.

One characteristic of large-scale 3D printed parts, that is not necessarily characteristic of molding processes, is that each layer may be applied to an existing layer that is somewhat cooler than the material being deposited. This may be mitigated to an extent, as the two materials may exchange heat during the print process, as a warmer bead of material may be deposited on a cooler bead of material. However, a certain amount of temperature differential may exist at the junction between each layer. This temperature differential may be sufficiently large to cause the part to warp or curl slightly upon cooling to room temperature.

The amount of distortion caused by warping may be relatively minimal for smaller parts (e.g., parts five feet long or less). Since 3D printing may involve creation of an object that is a near net shape object, the part may also be designed with additional stock to provide material for machining. For example, the added material may provide sufficient removable material, or trim stock, on the part such that the subtractive machining may result in the desired final shape without further adjustment. However, at least for some larger parts (e.g., parts ten feet long or longer), the amount of distortion caused by warping may be greater than the amount of trim stock available, resulting in a part in which warping cannot be easily corrected by trimming the part to the desired size and shape.

One exemplary application for large scale 3D printing is the production of molds and tooling. These items may be formed with a mold cavity, tool surface, or other surface which may be provided with a geometry and shape that corresponds to the part the completed mold or tool is intended to process. These molds and tooling may also include additional material that supports the mold cavity or tool surface. In one aspect, the mold cavity or tool surface may be the most important portion of the finished part. Thus, it may be beneficial to ensure that the mold cavity or tool surface is formed as accurately as possible. While it may be desirable to avoid modifying a mold cavity or tool surface, a support structure independent of the mold cavity or tool surface may be modified without affecting the performance of the completed part. It may therefore be desirable to create a part where, despite the fact that one or more portions of the part might be warped, such as a support structure, the mold cavity or tooling surface is formed in the desired geometry and is substantially free of warping.

In an exemplary configuration, X and Y directions may together define a plane parallel to a table top or other print surface, while a Z direction may define a "stacking" direction of the printed layers. Since the part may continuously cool during the print process, warp in the Z direction may continuously occur on layers which have already been printed and are cooling while new layers are printed completely flat and parallel with the print table. As the part grows, the mass of the part may increase accordingly, and may eventually have sufficient mass to resist warp distortion. Thus, at some point above the table top in the Z direction, warp distortion within the Z direction may become negligible or may even be eliminated. Thus, it may be desirable to provide warp compensation that is applied only to points where warp distortion will occur. Moreover, warping may also cause distortion to occur in the X and Y directions. This warping may be affected by the geometry of the part. For example, on a "C" shaped part, the ends of the "C" may tend to pull together when cooling. Thus, it may be desirable to compensate for warp in the X and Y (horizontal) directions, as well as in the Z (vertical) direction.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. An object of the warp compensation software is to compensate for the amount the part is expected to warp and create a new program that prints the part so when warping acts to cause the shape of the part to change to its intended shape. Thus, the final part will have a shape that corresponds to the shape provided in the original program.

In one aspect, an additive manufacturing method may include receiving a design model indicative of a part that may be fabricated using the additive manufacturing method, and generating expected-warping information based on the design model, the expected-warping information being indicative of an expected change in a shape of the part resulting from the additive manufacturing method. The method may also include modifying the design model based on the expected-warping information and fabricating the part using the modified design model.

In another aspect, a method of fabricating a part using an additive manufacturing apparatus may include receiving a design model representative of the part and predicting an amount of warping that the part will experience during cooling. The method may also include modifying at least a portion of the design model based on the predicted amount of warping and fabricating the part with the additive manufacturing apparatus based on the modified design model.

In another aspect, an additive manufacturing system may include a memory storing instructions and at least one processor configured to access the memory and execute the instructions stored in the memory. The instructions stored in the memory may include functions for receiving a design model indicative of a part and generating expected-warping information based on the design model, the expected-warping information being indicative of an expected change in a shape of the part. The instructions may also include functions for modifying the design model based on the expected-warping information and fabricating the part using the modified design model.

Software may be employed to generate predictive data corresponding to the amount and direction a structure produced by additive manufacturing, such as by 3D printing, will warp upon cooling. This predictive data may be used to modify information included in the original print program or design model to create a warp-offset design model or program which will print a part that, when the predicted warping occurs, the part may have the correct size and shape upon cooling.

A first exemplary approach for warp compensation may be employed with a warp-compensating program. In one aspect, the warp-compensating program may modify the original program or original design model, by warping or distorting the design model, thereby producing a warp-offset program. For example, the warp-compensating program may warp the original design model in a direction that is opposite with respect to a direction predicted by simulation software configured to predict warping. Suitable warp-prediction or warp simulation software may be in communication with, or provided as a part of, computer aided design (CAD) software program or CAD system. This warp-prediction software may result in a warp-offset model including bottom layers that are curved rather than straight. Since the print program for controlling the additive manufacturing apparatus may require a flat bottom layer, it may necessary to add or remove material to the bottom of the model provided to the controller for the additive manufacturing apparatus so that the bottom of the model is flat. This may be performed using suitable functions in a CAD program, for example. Appropriate software, such as slicing software, may be employed to add material to the bottom of the model to provide the flat bottom surface. Depending on the geometry of the part and the amount of expected warp, it may also be desirable to trim or add to the top surface of the model so that it is also flat and parallel with the bottom surface. In this adjustment process, it may be beneficial to ensure that no part of the mold cavity or tool surface is affected by the addition or subtraction. At this point, the warp-offset model may again be processed through the slicing software to configure the warp-offset model or program to be processed by a controller for the additive manufacturing system to manufacture the part.

A second approach to creating a warp-offset program may be performed within the control system of the additive manufacturing apparatus or print machine. For example, the control system of the print machine may accept the original program or original design model, and, using data that predicts point by point how the part will warp when printed and cooled, may modify the original design model to create a second program, or the warp-offset program. This may be performed by creating a second print path program using the original print path and predictive data as to how the original printed part will warp.

As each layer of the warp-offset model or program is developed, the software or program that generates the warp-offset model may determine where each point of that layer will be located after it warps and uses coordinates of that location from the original design model or part program as coordinates for the new point on the warp-offset model or part program. In that way, when that new point is printed and the part cools and warps, each point of the mold cavity or tool surface will be located in the desired position.

In this way, the geometry and design of the original unwarped model can be used to create a print program that will print a part which is at least partially distorted. When the printed partially-distorted part cools, the mold cavity or tool surface may warp into the desired shape. This approach may ensure that warping distortion of the cooled part is limited to support or trim stock which may be removed by machining, while functional features of the part, such as a mold cavity or tooling surface, will properly compensate for warping.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

Figure 1:
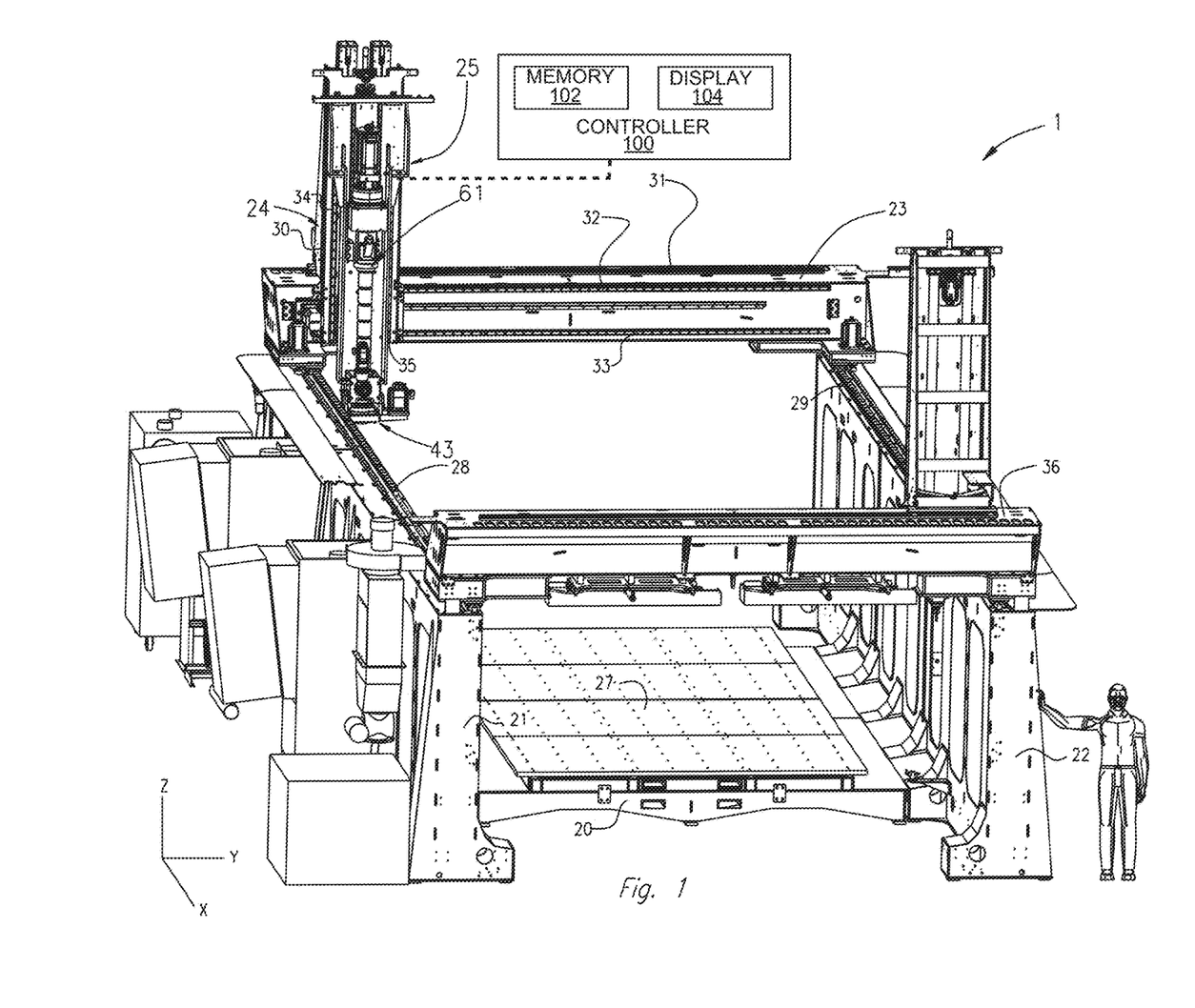
FIG. 1 is a perspective view of an exemplary additive manufacturing apparatus or CNC machine operable pursuant to an additive manufacturing process in forming articles, according to an aspect of the present disclosure.

The present disclosure is drawn to, among other things, methods and apparatus for fabricating one or more components via additive manufacturing or 3D printing techniques. Specifically, the methods and apparatus described herein may include a warp-compensating program configured to compensate for an amount a part may warp. The warp-compensating program may be configured to create a new program that prints the part so the warping acts to the bring the part to a desired shape. Referring to FIG. 1, additive manufacturing apparatus or CNC machine 1 may include a bed 20 provided with a pair of transversely spaced side walls 21 and 22, a printing gantry 23 and trimming gantry 36 supported on side walls 21 and 22, a carriage 24 mounted on printing gantry 23, a carrier 25 mounted on carriage 24, and an extruder 61 and an applicator assembly 43 each mounted on carrier 25. A horizontal worktable 27 may be supported on bed 20 between side walls 21 and 22. Horizontal worktable 27 may be provided with a support surface disposed in an x-y plane. Printing gantry 23 and trimming gantry 36 may extend along a y-axis, supported at the ends thereof on end walls 21 and 22, and may be fixed along an x-axis on a set of guide rails 28 and 29. As shown in FIG. 1, guide rails 28 and 29 may be provided on the upper ends of side walls 21 and 22. The printing gantry 23 and trimming gantry 36 may be displaceable by a set of servomotors respectively mounted on the printing gantry 23 and trimming gantry 36 and operatively connected to tracks provided on the side walls 21 and 22 of the bed 20. Carriage 24 may be supported on printing gantry 23 and provided with a support member 30 that is displaceably mounted on one or more guide rails 31, 32, and 33 on printing gantry 23. Carriage 24 may be displaceable along the y-axis and along the one or more guide rails 31, 32 and 33 by a servomotor mounted on the printing gantry 23 and operatively connected to support member 30. Carrier 25 may be mounted on a set of spaced, vertically-disposed guide rails 34 and 35 supported on the carriage 24 for displacing carrier 25 with respect to carriage 24. For example, carrier 25 may be displaceable along the z-axis by a servomotor mounted on the carriage 24 and operatively connected to the carrier 25.

An additive manufacturing system may include CNC machine 1 and a controller 100. Controller 100 may be configured to output control signals to control the various components of CNC machine 1 (e.g., printing gantry 23, trimming gantry 36, each servomotor of CNC machine 1, etc.). Controller 100 may receive feedback from one or more components of CNC machine 1. Moreover, controller 100 may include a memory 102, a display 104, as well as one or more processors that allow controller 100 to perform each of the functions described herein. Memory 102 may include a suitable non-transitory storage device such as a hard disk drive, solid state drive, USB drive, or any other suitable physical medium. Controller 100 may also include a random-access memory and/or read-only memory. Memory 102 may store, for example, a suitable warp-prediction program, computer-aided design programs, or other programs and/or software described herein. Controller 100 may be provided as a single computing or control device, or may be distributed across one or more additional devices. Display 104 may be any suitable display, and may be integrated with controller 100 or located at a remote location with respect to controller 100. Display 104 may display each of the exemplary CAD models described herein. Display 104 may include a touchscreen or other input device. Controller 100 may also include any other suitable input device, such as one or more of a keyboard, a touchpad, a mouse, a stylus, etc. Controller 100 may be wirelessly connected to CNC machine 1 or may be connected to machine 1 using wires. Electronic signal lines, with the exception of a signal line extending from controller 100 to exemplary printing components of CNC machine 1, have been omitted for clarity.

Figure 2:
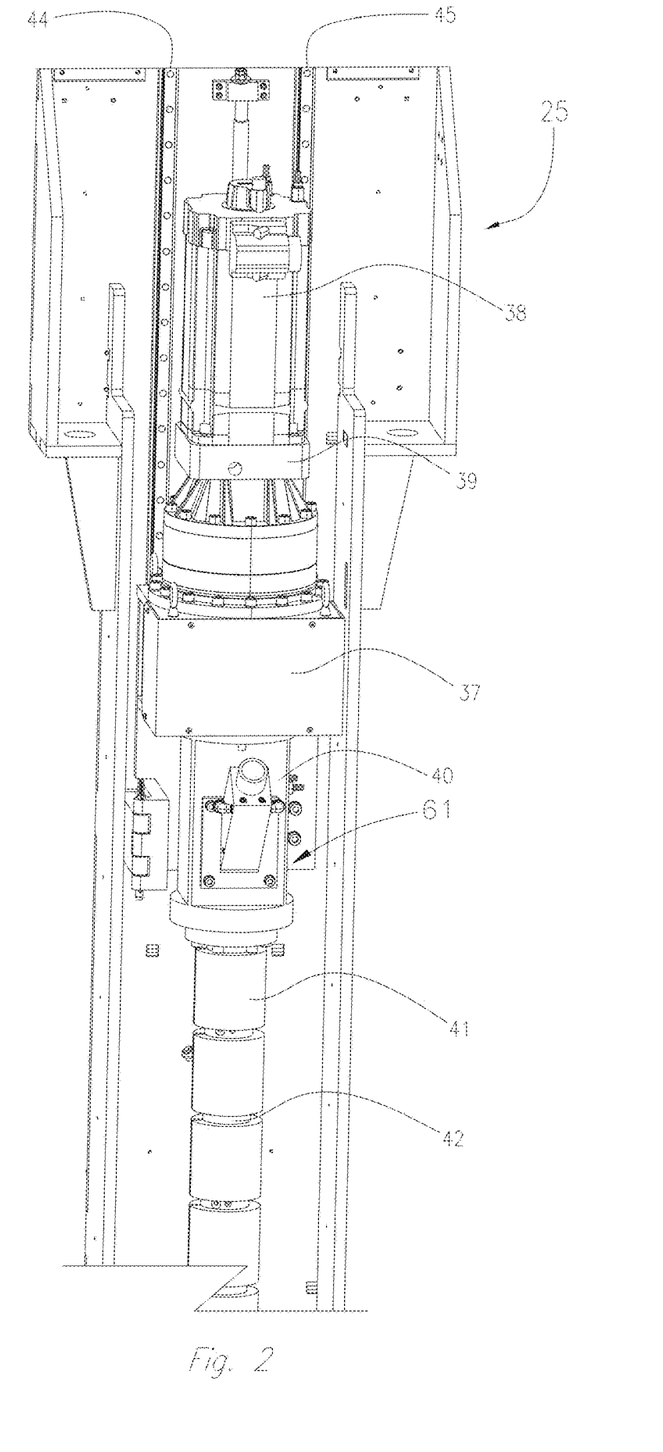
FIG. 2 is a perspective view of an exemplary carrier and extruder assembly of the exemplary CNC machine shown in FIG. 1.

As shown in FIG. 2, extruder 61 may be mounted to carrier 25 on a set of rails 44 and 45 and bearings in a linearly movable manner. Extruder 61 may be driven by a servomotor 38, e.g., through a gearbox 39 attached to transition housing 37. Extruder 61 may receive thermoplastic pellets via a feed housing 40. These pellets may be transferred by an extruder screw through barrel 42 where the pellets may melt by heat generated by the friction of the extruder screw and/or heat generated by heaters 41. Then extruder 61 may cause molten thermoplastic material provided by the melted pellets to flow to a gear (or melt) pump 62 (FIG. 3).

Figure 3:
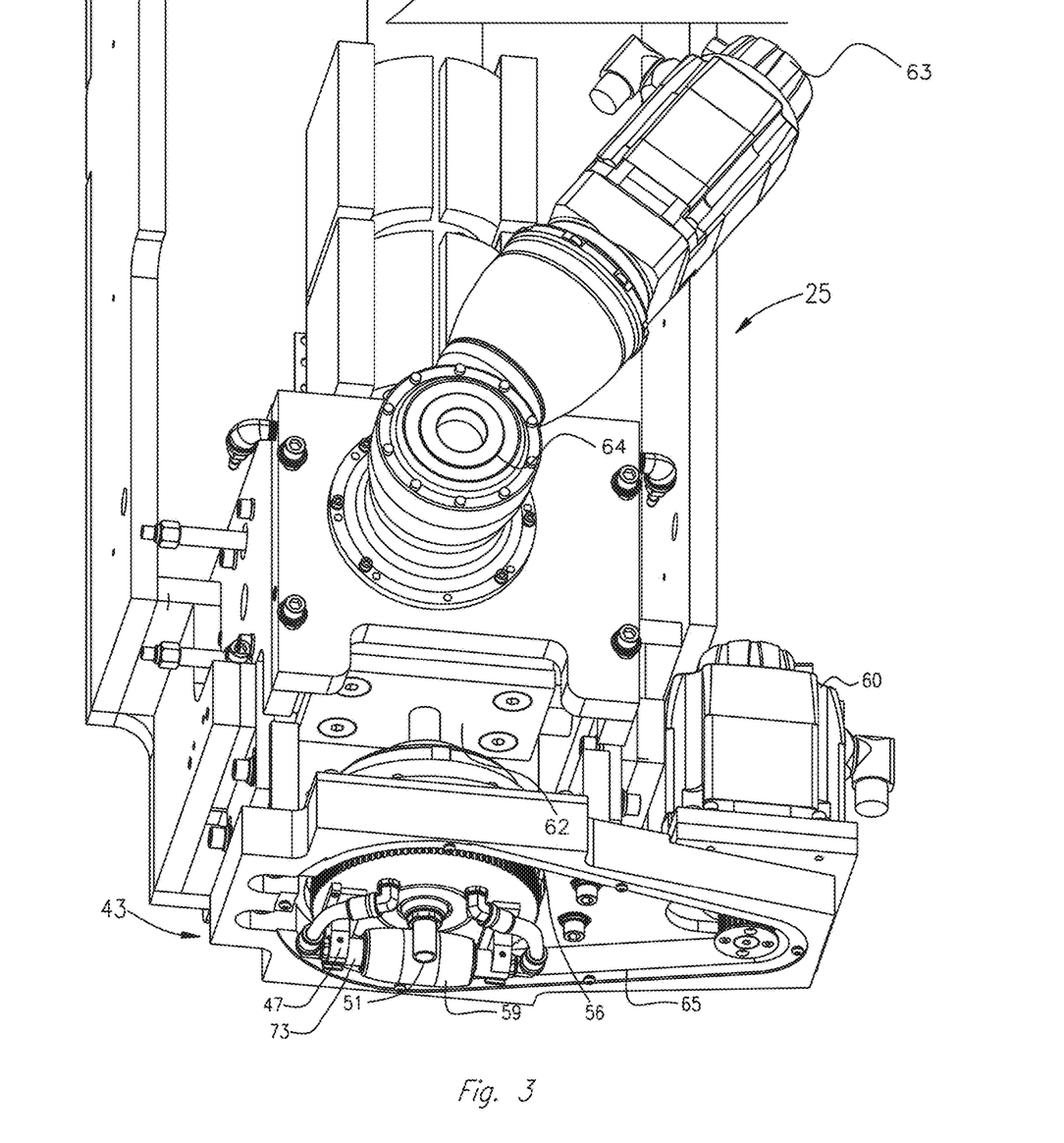
FIG. 3 is an enlarged perspective view of an exemplary carrier and applicator assembly of the exemplary CNC machine shown in FIG. 1.

As shown in FIG. 3, gear pump 62 may be fixedly mounted to the bottom of carrier 25. In an exemplary configuration, gear pump 62 may be a positive displacement gear pump, and may be driven by a servomotor 63 through a gearbox 64. Gear pump 62 may receive molten plastic from extruder 61 (FIG. 2), and may meter out precise amounts of thermoplastic material at predetermined flow rates to a nozzle 51 to print the part. The use of both extruder 61 and gear pump 62 rather than an extruder alone may offer the ability to employ extruder screw designs which have desirable characteristics but which may be unusable in configurations that do not include a gear pump, such as extruder screw designs that may tend to cause uneven material flow. The gear pump 62 may provide an even flow of material regardless of the extruder screw design, thereby providing a high level of design freedom for the extrusion screw.

A bead shaping roller 59 may be rotationally mounted in carrier bracket 47 to provide a means for flattening and leveling an enlarged bead of fluid material (e.g., molten thermoplastic) extruded from the nozzle 51. Carrier bracket 47 may be rotationally displaceable by a servomotor 60. In one aspect, servomotor 60 may be operatively connected to carrier bracket 47, through a pulley 56 and belt 65.

Figure 4:
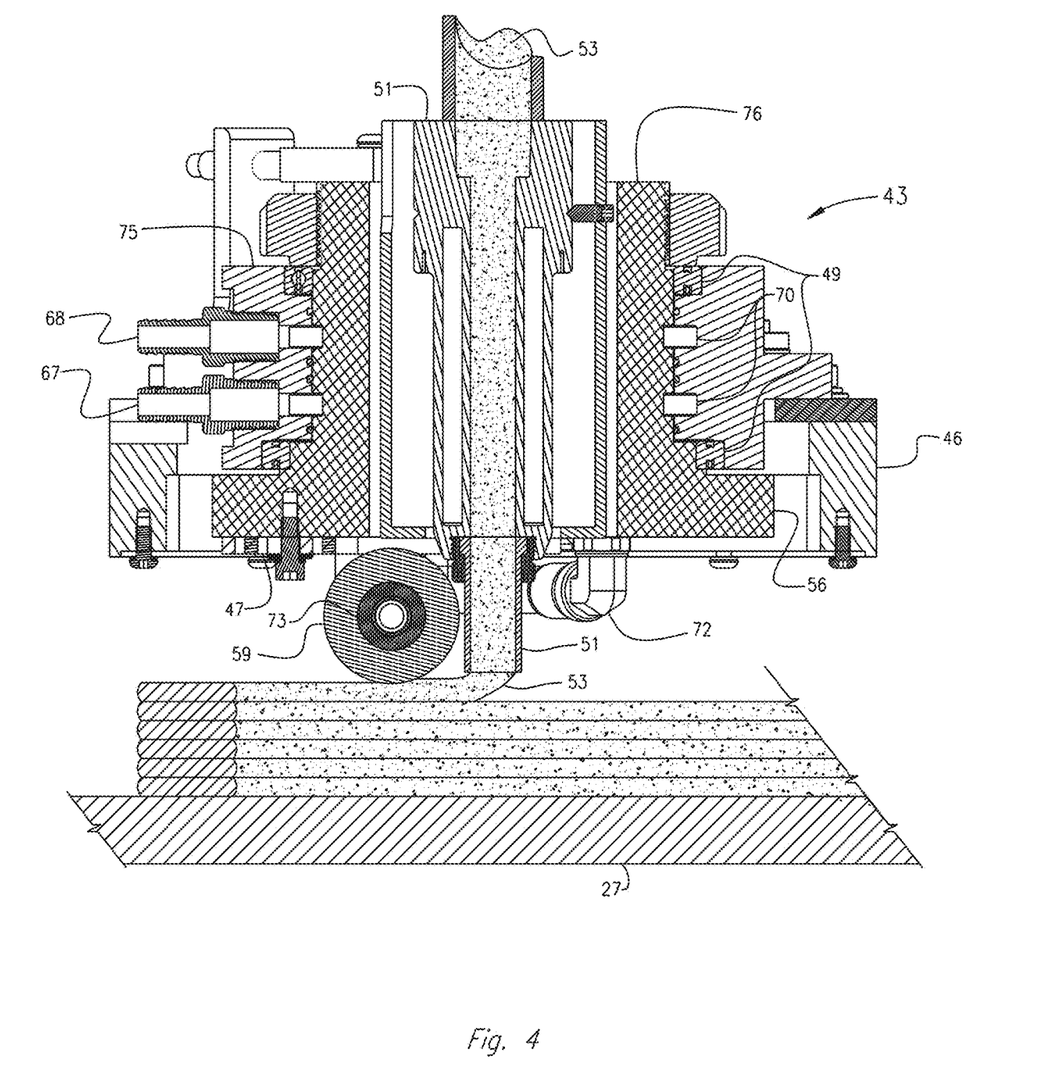
FIG. 4 is an enlarged cutaway view of an exemplary applicator head assembly shown in FIG. 3.

With continued reference to FIG. 4, applicator head 43 may include a housing 46 with rotary union mounted therein. In the exemplary configuration illustrated in FIG. 4, pulley 56 may be machined into the inner hub 76 of the rotary union. Inner hub 76 may include an interior opening large enough in diameter to allow the heated print nozzle 51 to pass therein. Inner hub 76 may rotate on a set of bearings 49 provided in the rotary union's outer housing 75. The compression roller assembly (e.g., carrier bracket 47 and compression roller 59) may be attached to the inner hub 76 of the rotary union so that the compression roller 59 rotates about the print nozzle 51. The rotary union may also include barb fittings 67 and 68 ported into coolant passages 70 that encompasses or surrounds inner hub 76 and the interior of outer housing 75. The coolant passages 70 may continue through quick disconnect fittings 72 into the axle 73 of the compression roller 59.

As best shown in FIGS. 3 and 4, for example, an oversized molten bead of a flowable material (e.g., molten thermoplastic) may be provided under pressure from a source disposed on carrier 25 (e.g., gear pump 62) or another source, to applicator head 43. This material may be provided to nozzle 51 in communication with applicator head 43, which may be fixedly connected to carrier 25. In use, the flowable material 53 (e.g., thermoplastic) may be heated sufficiently to form a large molten bead, which is then extruded through applicator nozzle 51 to form substantially uniform, smooth rows of deposited material on a surface of worktable 27. Such beads of molten material may be flattened, leveled, and/or fused to adjoining layers with substantially no trapped air by bead-shaping compression roller 59 with the layers forming 3D printed products.

3D printed products may be manufactured with CNC machine 1 based on one or more CAD models. In one aspect, a CAD model may be provided on a computer or control system such as controller 100. CNC machine 1 may be configured to produce large parts or products, such as products extending in a horizontal direction by 10 feet or more. However, CAD models that correspond to large parts or products (e.g., parts or products larger than approximately 10 feet with respect to the x-axis and/or the y-axis) may warp when printed, producing a part that deviates from the CAD model.

Figure 5A:
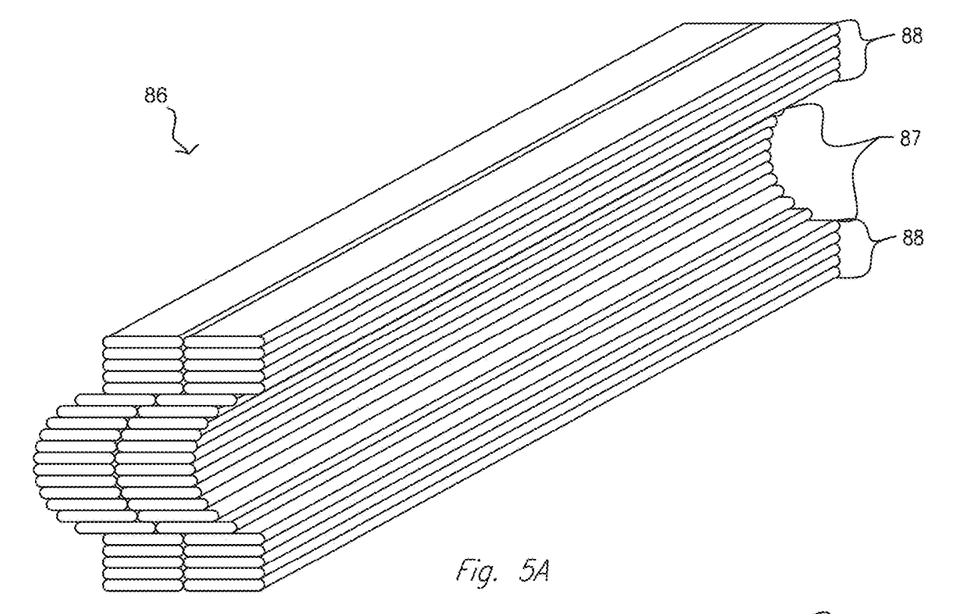
FIG. 5A is a view of an exemplary CAD image of an original program or CAD model of a printed part with a profile as shown in the slicing software.

FIG. 5A illustrates an exemplary design model or CAD model 86 of a relatively long part, such a tool or a mold having a length or width greater than 10 feet. The CAD model 86 of this exemplary part, as shown in FIG. 5A, may correspond to a presentation of 3D CAD model on a display, such as display 104 of controller 100. CAD model 86 may be as presented on display 104 by slicing software. This slicing software may be a program configured to divide CAD model 86 into a plurality of slices, or layers, that represent each layer deposited by CNC machine 1 to manufacture the part.

With continued reference to FIG. 5A, CAD model 86 may include a portion that has a substantially C-shaped profile. This C-shape may form a mold or tool cavity 87 of the part. Thus, the resulting part may include a mold or tool cavity that corresponds to the cavity 87 in CAD model 86. Trim or support stock portions 88 may be present above and/or below the cavity 87. When manufactured, these portions 88 may form trim stock (e.g., material that may be intended to be trimmed to provide a desired surface finish or feature), support stock (e.g., material that is printed so as to provide support to a portion of the part during manufacturing), or both. The trim or support stock portions 88 may correspond to portions of the part that are intended to be removed once the part has been extruded. Thus, the trim or support stock 88 may be removed as needed or desired, such as during a finishing or trimming process performed by trimming gantry 36.

Before producing a part corresponding to CAD model 86 with CNC machine 1, the CAD model 86 may be loaded (e.g., provided via a removable or permanent storage medium, transmitted via one or more networks, and/or loaded from memory 102) into a warp-prediction program. Suitable warp-prediction programs or software may be stored on memory 102 of controller 100, or provided on another suitable device. The warp-prediction program may then analyze CAD model 86 and, based on the analysis, predict the amount of warping, as well as the direction of warping, for each location the 3D printed structure of the part that may experience warping. This warping may be experienced by the part during cooling, for example.

Figure 5B:
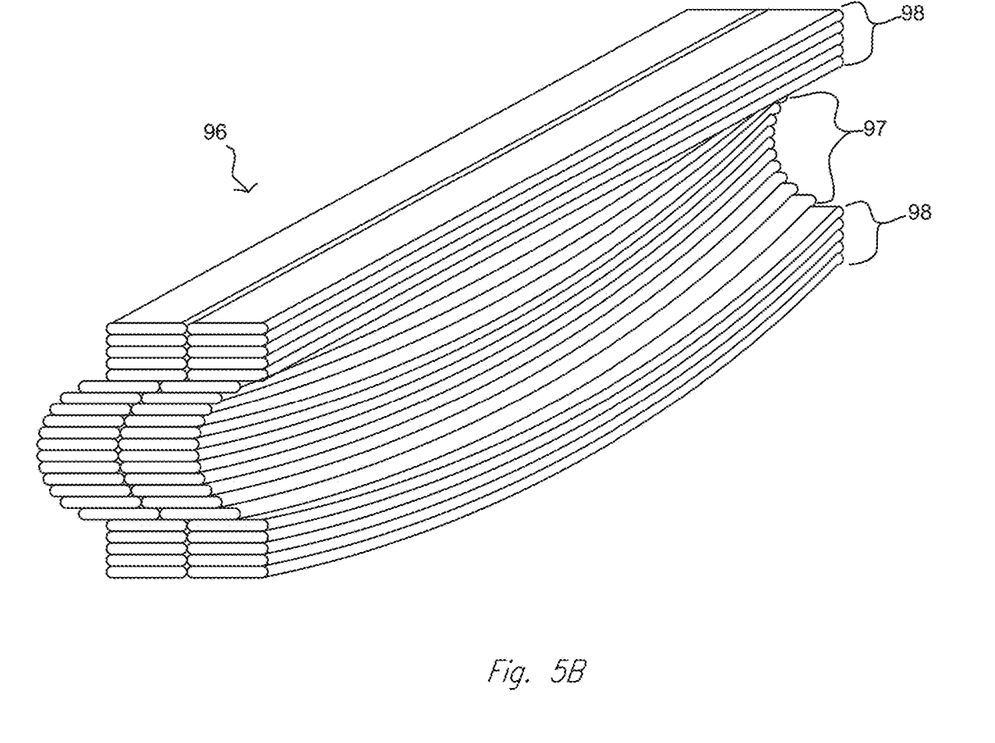
FIG. 5B is a view of an exemplary warped model generated by warp-prediction software based on a profile of an exemplary long part.

FIG. 5B illustrates an example of an expected-warp model 96 corresponding to the CAD model 86. Expected-warp model 96 may correspond to predicted-warp information output from the warp-prediction program based on an analysis of model 86. For example, the warp-prediction program may analyze one or more layers of CAD model 86 based on orientation, size (thickness), and the location of adjacent layers or beads of material. Expected-warp model 96 may represent a simulated amount of warping that the part, based on CAD model 86, will experience during manufacturing and while the part cools. The warp-predication program, after analyzing the CAD model 86, may present expected-warp model 96 in an image (e.g., via display 104) that corresponds to the predicted amount of warping that the part will experience to allow an operator to observe an amount of predicted warp in each portion of the part. The expected-warp model 96 may be generated for a portion or an entirety of the model 86 or the part.

When the CAD model 86 is analyzed by the warp prediction-program, the analysis may determine that, when printed, the ends of the part will warp or curve upward (away from a surface of worktable 27). Thus, expected-warp model 96 may include ends that are curved upwardly (towards a z-direction and away from a support surface). As can be seen in FIG. 5B, warping may be expected to occur in a lower trim or support stock portion 98, as well as in mold or tool cavity 97. Depending on the height of the part, the warp-prediction program may determine that, a particular height (or particular distance along the z-axis), warping may be substantially zero. For example, the warp-predication program may determine that the upper portion of expected-warp model 96, formed by an upper trim or support stock portion 98, is expected to be substantially free of warping. Depending on the geometry of the part, the heat of the melted thermoplastic material, or other variables, the warp-prediction program may instead determine that warping is expected to occur across the entire height of the expected-warp model 96, including an upper portion and/or top surface.

In one aspect, the information provided by the warp-prediction program may be used to distort or warp the original CAD model 86. For example, CAD model 86 may be modified by using a warp-compensating program or software, such as a CAD program. This program may be the same program used to create CAD model 86, or may be a separate warp-compensating program. Additionally or alternatively, the warp-compensating program may be provided in the slicing program. The warp compensating-program may be configured to distort or warp at least a portion of CAD model 86 in a direction that is opposite to the predicted warp. This may be performed via an automated process or a manual process. The warp-compensating program may be incorporated within controller 100, or may be provided in a separate controller or computing device.

Figure 6A:
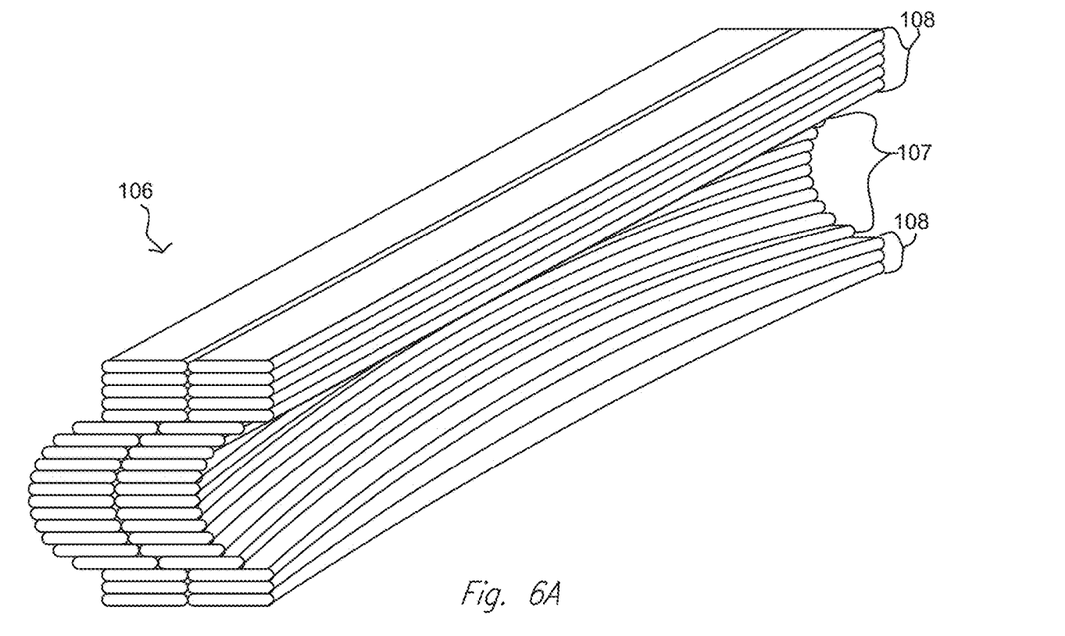
FIG. 6A is a view of an exemplary CAD image of a warp compensated program long printed part with a profile.

FIG. 6A illustrates an example of an intentionally warped or distorted CAD model, such as warp-offset model 106, that may be formed by modifying CAD model 86 with the warp-compensating program. Warp-offset model 106 may form a modified design model and may include an intentionally distorted or warped portion in at least a portion thereof, such as a lower trim or support stock portion 108. For example, lower portion 108 may be distorted or warped in a direction opposite to the predicted warp of expected-warp model 96. In one aspect, an upper or top portion (e.g., an upper trim or support stock portion 108 that may form trim stock) of the warp-offset model 106 may also be intentionally distorted or warped in a direction opposite the predicted warp of the upper or top portion of predicted-warp model 96. As these portions 88 may correspond to trim or support stock, these portions (the bottom portion, top portion, or both) may be trimmed with trimming gantry 36 of the CAD system. Thus, even if trim or support stock of such portions of the final part remains warped, warping is limited to portions that are intended for removal or that will not have a deleterious effect on the performance of the part. Warp-offset model 106 may be processed by slicing software to produce a program configured to operate CNC machine 1 to produce a part based on warp-offset model 106.

As mold or tool cavity 107 may be intentionally warped by the warp-compensating program in a direction opposite to the expected warping, the resulting portion in the manufactured part, such as part 116 described below, may be formed with a final shape that closely matches original CAD model 86. For example, a side surface of mold or tool cavity 107 may have a modified horizontal location as compared to CAD model 86. For example, as shown in FIG. 6A, the side surfaces of one or more layers of mold or tool cavity 107 may be curved in a direction opposite to a curvature of the corresponding mold or tool cavity 97 of expected-warp model 96. The mold or tool cavity 107 may be expected to warp and shift in a direction toward mold or tool cavity 87 (FIG. 5A). Thus, while it is possible that trim or support stock portions in the produced part may be distorted or warped as compared to the exemplary original CAD model 86, the mold or tool cavity may closely match the mold or tool cavity 87 of CAD model 86.

Figure 6B:
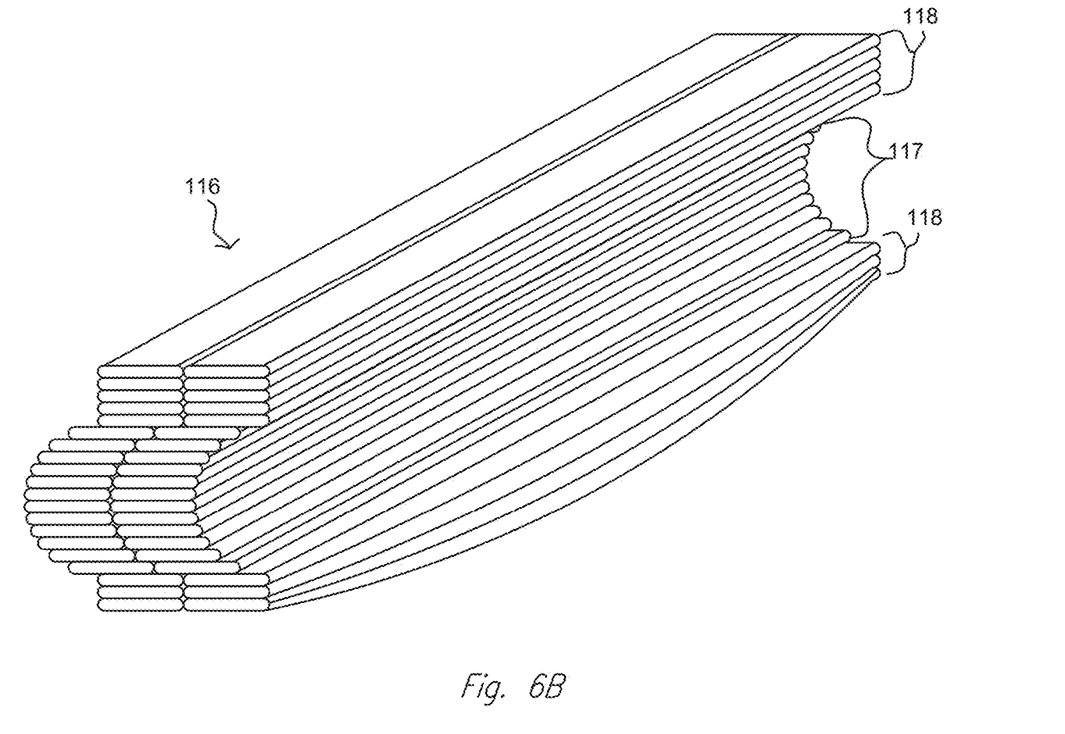
FIG. 6B is a view of an exemplary long part printed based on the warp compensated program.

FIG. 6B is an exemplary depiction of a part 116 manufactured based on a warp-modified program. Part 116 may be produced by processing warp-offset model 106 with slicing software and subsequently manufacturing a part based on the processed offset-model 106. Part 116 may include an exemplary C-shaped mold or tool cavity 117 free or substantially free of any warping. Thus, the mold or tool cavity 117 may match the corresponding mold or tool cavity 87 of the original CAD model (FIG. 5A). The extra trim or support stock 118 above and below the C-shape mold or tool cavity 87 may be removed after manufacturing, if necessary, (e.g., by machining).

It should be noted that FIGS. 5A-6A illustrate 3D models of an object that, in some cases, may be fabricated using CNC machine 1. As would be recognized by persons of ordinary skill in the art, a 3D model is a mathematical representation of the surface of the object that, in some cases, is produced by software tools. Since methods of producing 3D models are well known in the art, they are not discussed herein.

Figure 7:
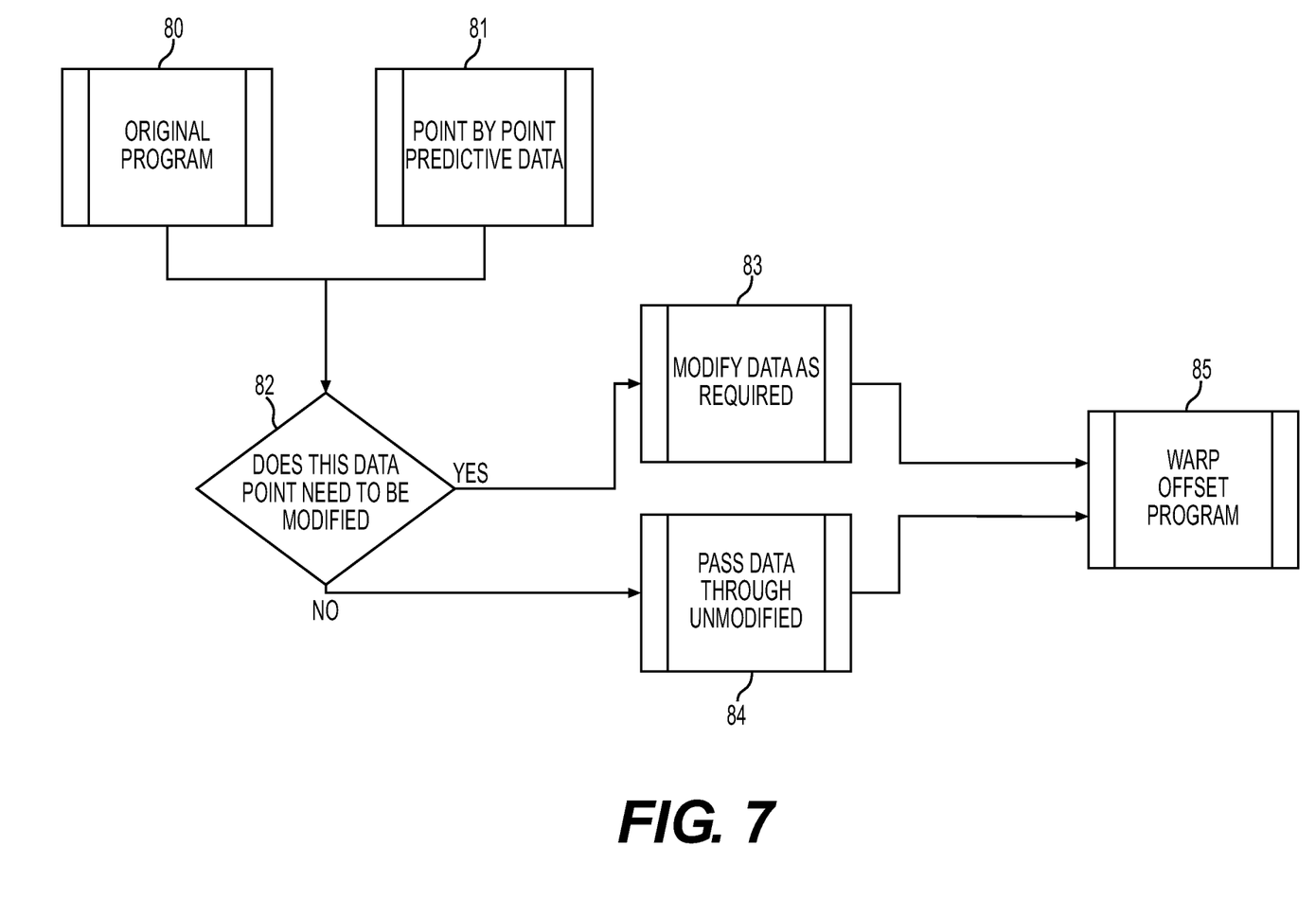
FIG. 7 is an flow chart of an exemplary warp-compensation process that may be used with an additive manufacturing apparatus.

With reference to FIG. 7, an exemplary manufacturing method may include performing a point-by-point analysis to create a warp-offset program or model. In one aspect, the exemplary warp-compensation process may be performed by a control system or control device (e.g., controller 100) of a manufacturing device such as CNC machine 1. For example, a step 80 may include receiving an original program 80. Original program 80 may correspond to an unwarped CAD model, such as CAD model 86. Original program 80 may be stored in memory 102, or may be loaded into memory 102 in any suitable manner. At step 81, point-by-point predictive data, which may correspond to predicted warping information, may be received or generated by controller 100. In one example, step 81 may include generating point-by-point predictive data with warp-prediction software. This warp-prediction software may be stored in memory 102 of controller 100, or provided via another computing system. The point-by-point predictive data may calculate how a plurality of points in one or more layers of the CAD model 86 may warp when a part printed based on CAD model 86 cools.

A step 82 may include evaluating the original program of step 80 and the point-by-point predictive data of step 81 to determine whether an individual point of the original program should be modified. This may be determined by comparing respective points from steps 80 and 81 to determine if, for a particular point, warping is expected to occur. If warping is expected to occur, or if the expected warping exceeds a predetermined threshold amount, the data point may be modified based on the amount and direction of expected warping. For example, step 83 may include determining where the point of will be located after the point warps (from the point-by-point predictive data) and uses coordinates of this location to modify the corresponding point on the original part (e.g., in a direction opposite to the direction of the expected warping). The coordinates of this modified point may be incorporated in the warp-offset program 85.

Returning to step 82, if warping is not expected to occur for a particular point, or if expected warping does not exceed a predetermined threshold amount, step 82 may proceed to step 84. Step 84 may include passing the data point, without modification, to the offset-compensated program 85. Thus, the warp-offset program generated in step 85 may be based on each point evaluated in step 82 and may include a plurality of unmodified points from the original program, and a plurality of points that were modified based on the difference between a point in the original program and a corresponding point in the point-by-point predictive data.

Steps 82, 83, and 84 may be repeated for each point included in the original program until the warp-offset model or program corresponding to the part is completed. These steps may be performed for each layer of a part in a layer-by-manner manner, by evaluating each of the points of a particular layer (e.g., a layer generated by slicing software), before evaluating points of a subsequent layer. Once these steps have been completed, the resulting warp-offset program may include one or more points that were modified according to step 83, and one or more points that were not modified according to step 84.

The warp-offset program 85 may then be used to print the part. One or more working portions, such as a part or entirety of mold or tool cavity 117, may experience warping that draws this portion into the position defined by the intended mold or tool cavity 87, as represented in CAD model 86. Thus, the working portions of the resulting part may more closely resemble the intended shape, providing a more accurate manufacturing process. Once the additive manufacturing process is completed, trim or support stock 118 of the part 116 may be removed as needed.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited by the appended claims.

What is claimed is:

1. An additive manufacturing method, comprising:
   receiving a design model indicative of a part that may be fabricated using the additive manufacturing method, wherein the design model includes a plurality of layers stacked on each other in a vertical direction;
   generating expected-warping information based on the design model, the expected-warping information being indicative of an expected change in a shape of the part resulting from the additive manufacturing method;
   modifying the design model based on the expected-warping information, including shifting a portion of the design model that corresponds to a cavity of a mold in a horizontal direction away from an expected warping of the portion so as to modify a horizontal location of at least a portion of the cavity of the mold; and
   fabricating the part using the modified design model, including the shifted portion that corresponds to the cavity of the mold.

2. The additive manufacturing method of claim 1, wherein generating the expected-warping information includes generating an expected-warping model.

3. The additive manufacturing method of claim 2, wherein modifying the design model includes creating the modified design model to include a portion that is shifted in a direction opposite to a corresponding portion of the expected-warping model.

4. The additive manufacturing method of claim 3, wherein the plurality of layers includes at least one layer for support or trim material and at least one layer for the cavity of the mold.

5. The additive manufacturing method of claim 4, wherein the modifying the design model includes modifying the cavity of the mold at a location above the at least one layer for support or trim material.

6. The additive manufacturing method of claim 5, wherein the modifying the design model includes modifying the cavity of the mold of the design model based on the expected-warping model.

7. The additive manufacturing method of claim 6, wherein the modifying the cavity of the mold of the design model includes modifying the horizontal location of at least the portion of the cavity of the mold at a location above at least one layer for support material and below at least one layer for trim material.

8. The additive manufacturing method of claim 1, wherein generating expected warping information includes generating a plurality of points that correspond to a respective plurality of points in the design model.

9. The additive manufacturing method of claim 8, wherein the modifying the design model includes modifying at least one point of the design model based on a difference between the at least one point of the design model and a corresponding point of the expected-warping information.

10. The additive manufacturing method of claim 9, wherein the modifying the design model includes modifying a plurality of points of the design model based on a corresponding plurality of points of the expected-warping information.

11. A method of fabricating a part using an additive manufacturing apparatus, comprising:
    receiving a design model representative of the part, wherein the design model includes a plurality of layers stacked on each other in a vertical direction;
    predicting an amount of warping that the part will experience during cooling;
    modifying at least a section of the design model based on the predicted amount of warping, including shifting a portion of the design model that corresponds to a cavity of a mold in a horizontal direction away from an expected warping of the portion so as to modify a horizontal location of at least a portion of the cavity of the mold; and
    fabricating the part with the additive manufacturing apparatus based on the modified design model.

12. The method of claim 11, wherein the method further includes moving a nozzle of the additive manufacturing apparatus along a path based on the modified portion of the design model.

13. The method according to claim 11, wherein the modified design model is a warp-offset model including a surface for the cavity of the mold that is different than a corresponding surface of the design model.

14. The method of claim 13, further including:
    generating an expected-warping model; and
    displaying the warp-offset model on a display, wherein at least a portion of the warp-offset model has a shape that is different than a shape of the design model and a shape of the expected-warping model.

15. The method of claim 13, wherein the warp-offset model includes a side surface that is curved in a direction opposite to the predicted amount of warping in a corresponding side surface of the design model.

16. The method of claim 15, wherein the curved side surface of the warp-offset model corresponds to the cavity of the mold.

17. The method of claim 11, wherein the plurality of layers includes at least one layer for support or trim material and at least one layer for the cavity of the mold.

18. The method of claim 17, wherein the modifying the design model includes modifying the cavity of the mold at a location above the at least one layer for support or trim material.

19. The method of claim 18, wherein the modifying the cavity of the mold includes modifying the horizontal location of at least the portion of the cavity of the mold at a location above at least one layer for support material and below at least one layer for trim material.

* * * * *